United States Patent
Ozbaysal

(10) Patent No.: US 11,344,977 B2
(45) Date of Patent: May 31, 2022

(54) STRUCTURAL BRAZE FOR SUPERALLOY MATERIAL

(71) Applicant: Siemens Energy, Inc., Orlando, FL (US)

(72) Inventor: Kazim Ozbaysal, Orlando, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 1374 days.

(21) Appl. No.: 14/294,569

(22) Filed: Jun. 3, 2014

(65) Prior Publication Data

US 2015/0290747 A1  Oct. 15, 2015

Related U.S. Application Data

(63) Continuation-in-part of application No. 14/251,691, filed on Apr. 14, 2014.

(51) Int. Cl.
| | | |
|---|---|---|
| B23K 35/30 | (2006.01) | |
| B23K 35/02 | (2006.01) | |
| C22C 19/00 | (2006.01) | |
| C22C 19/05 | (2006.01) | |
| C22C 19/03 | (2006.01) | |

(52) U.S. Cl.
CPC ...... *B23K 35/3033* (2013.01); *B23K 35/0222* (2013.01); *B23K 35/30* (2013.01); *B23K 35/304* (2013.01); *C22C 19/007* (2013.01); *C22C 19/03* (2013.01); *C22C 19/05* (2013.01); *C22C 19/058* (2013.01)

(58) Field of Classification Search
CPC ....... C22C 19/03; C22C 19/05; C22C 19/056; C22C 19/057
See application file for complete search history.

(56) References Cited

U.S. PATENT DOCUMENTS

| | | | |
|---|---|---|---|
| 2,872,309 A * | 2/1959 | Bolkcom | B23K 35/3026 420/416 |
| 3,660,082 A | 5/1972 | Negishi et al. | |
| 5,006,328 A | 4/1991 | Hong | |
| 6,027,584 A | 2/2000 | Jackson et al. | |
| 6,464,128 B1 | 10/2002 | Messelling | |
| 6,520,401 B1 | 2/2003 | Miglietti | |
| 6,530,971 B1 | 3/2003 | Cohen et al. | |
| 6,726,086 B2 | 4/2004 | Phillip | |

(Continued)

FOREIGN PATENT DOCUMENTS

| | | |
|---|---|---|
| CN | 101422851 A | 5/2009 |
| CN | 103702793 A | 4/2014 |

(Continued)

OTHER PUBLICATIONS

English Machine translation of EP 1764182 A1 of Heinz published Mar. 21, 2007.*

(Continued)

*Primary Examiner* — Jophy S. Koshy

(57) ABSTRACT

Boron and silicon free braze alloys are useful for structural repair of superalloy gas turbine engine components. The braze alloy compositions include nickel, chromium, titanium, and at least one of zirconium and hafnium. All of the above elements are metallic and form ductile bonds within and across the braze interface when compared to non-metallic bonds of boron and silicon.

4 Claims, 1 Drawing Sheet

(56) References Cited

U.S. PATENT DOCUMENTS

| | | | |
|---|---|---|---|
| 7,156,280 B1 * | 1/2007 | Jiang | B23K 35/3033 |
| | | | 148/562 |
| 7,293,688 B2 | 11/2007 | Ozbaysal | |
| 7,328,832 B2 | 2/2008 | Ozbaysal | |
| 7,335,427 B2 | 2/2008 | Sathian | |
| 7,363,707 B2 | 4/2008 | Powers | |
| 7,434,720 B2 | 10/2008 | Ozbaysal | |
| 7,461,772 B2 | 12/2008 | Ozbaysal | |
| 7,506,793 B2 | 3/2009 | Sathian | |
| 7,748,601 B2 | 7/2010 | Ozbaysal | |
| 7,867,628 B2 | 1/2011 | Ozbaysal | |
| 7,874,473 B2 * | 1/2011 | Heinz | B23K 1/0018 |
| | | | 228/119 |
| 8,087,565 B2 | 1/2012 | Kottilingam et al. | |
| 8,356,409 B2 | 1/2013 | Perret | |
| 8,640,942 B1 | 2/2014 | Ozbaysal et al. | |
| 2005/0281704 A1 | 12/2005 | Srinivasan | |
| 2009/0159645 A1 | 6/2009 | Cretegny et al. | |
| 2009/0280023 A1 | 11/2009 | Hu | |
| 2010/0038412 A1 | 2/2010 | Huang | |
| 2010/0059573 A1 | 3/2010 | Kottilingam et al. | |
| 2013/0302647 A1 | 11/2013 | Ozbaysal et al. | |
| 2014/0007988 A1 | 1/2014 | Ozbaysal | |

FOREIGN PATENT DOCUMENTS

| | | | |
|---|---|---|---|
| CN | 104334313 A | 2/2015 | |
| CN | 104428101 A | 3/2015 | |
| DE | 2903792 A2 | 7/1980 | |
| EP | 1764182 A1 * | 3/2007 | B23K 1/0018 |
| JP | H09108913 A | 4/1997 | |

OTHER PUBLICATIONS

English machine translation of JP 09-108913 A of Ohashi published Apr. 28, 1997 (Year: 1997).*

Warren Miglietti, High Strength, Ductile Braze Repairs for Stationary Gas Turbine Components, Part 2, ASME Conference Proceedings, ASME Turbo Expo 2009: Power for Land, Sea, and Air (GT2009), Jun. 8-12, 2009, Orlando, Florida, USA.

Xiao Huang, et al., Wide Gap Braze Repair of Gas Turbine Blades and Vanes—A Review, Journal of Engineering for Gas Turbines and Power, vol. 134, Jan. 2012, pp. 010801-1 thru 010801-17.

* cited by examiner

STRUCTURAL BRAZE FOR SUPERALLOY MATERIAL

This application is a continuation-in-part of U.S. patent application Ser. No. 14/251,691, filed 14 Apr. 2014, incorporated by reference herein.

FIELD OF THE INVENTION

This invention relates generally to the field of materials technology, and more particularly to the joining or repair of superalloy materials with a brazing process.

BACKGROUND OF THE INVENTION

It is recognized that the repair of superalloy materials is made difficult due to their susceptibility to weld solidification cracking and strain age cracking. The term "superalloy" is used herein as it is commonly used in the art; i.e., a highly corrosion and oxidation resistant alloy that exhibits excellent mechanical strength and resistance to creep at high temperatures. Superalloys typically include a high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, C263, 718, X-750, ECY 768, 282, X45, PWA 1483 and CMSX (e.g. CMSX-4) single crystal alloys.

Brazing processes are used to repair superalloy materials in some applications. While a braze joint is generally understood to be mechanically weaker than a weld joint and to have a lower acceptable operating temperature due to the relatively low melting temperature of the braze material, braze repairs may be acceptable in certain lower stress and/or lower temperature applications.

Typical braze materials using boron or silicon as the melting point depressant material are of limited value with superalloy substrate materials because they create deleterious phases which reduce the ductility of the joint and repaired region. Boron and silicon free braze alloys incorporating hafnium and/or zirconium have been developed for which mechanical properties of up to 80% of the base superalloy properties are claimed.

The present inventor has developed several boron and silicon free braze alloys utilizing titanium as a melting point depressant material, including those disclosed in co-pending United States patent application publication numbers US 2013/0302647 A1 and US 2014/0007988 A1. Titanium based braze alloys can provide brazed joints having mechanical strength close to (e.g. more than 80% of) the repaired substrate material properties such that the repair can be considered a structural repair and can be used in relatively high stressed regions of the component.

BRIEF DESCRIPTION OF THE DRAWINGS

The invention is explained in the following description in view of the drawings that show.

DETAILED DESCRIPTION OF THE INVENTION

Figure 1:
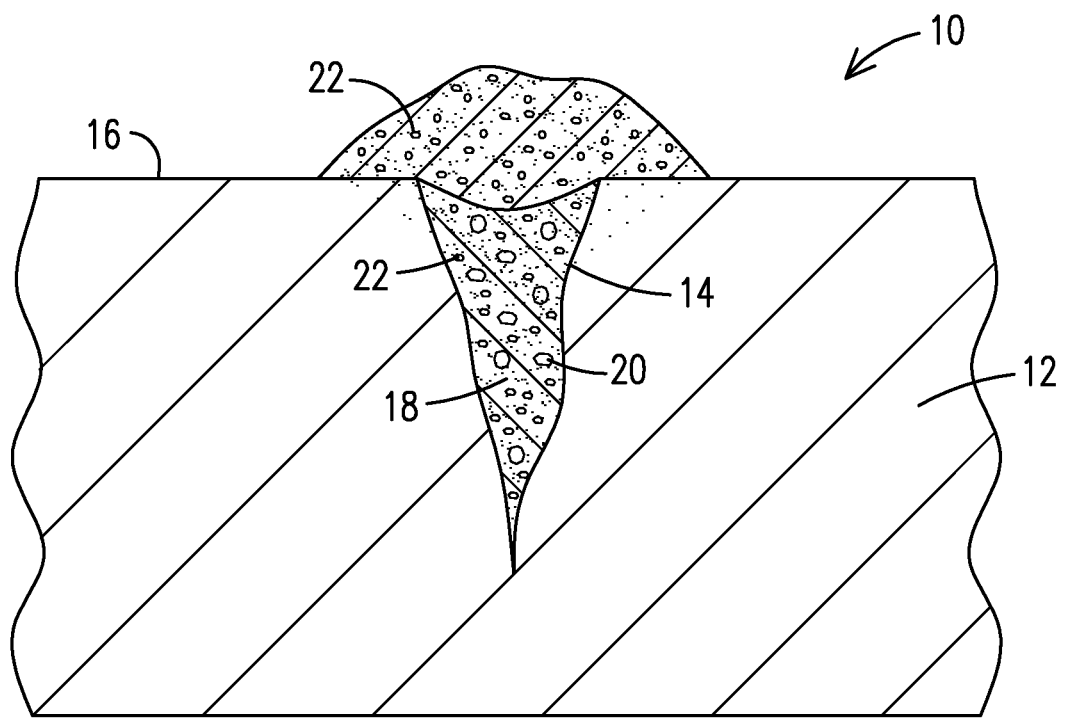
FIG. 1 is a side sectional view of a gas turbine vane wherein a large gap discontinuity is being repaired by brazing.

Braze alloys are disclosed herein that are particularly useful with superalloys, including Rene 80 and IN 939 superalloy material, for example when repairing a gas turbine engine blade or vane that has been found to have service-induced cracks on its platform or airfoil section. Rene 80 components present a particular challenge because they may be solution heat treated at 1,205° C., which is lower than some other alloys, such as Alloy 247 components which may be solution heat treated at 1,235° C. Alloys disclosed below may be formulated to have liquidus and solidus temperatures and melting temperature ranges that can be tailored to work cooperatively with a solution heat treatment temperature regiment for the particular superalloy material of the component to accomplish a braze and to fuse and to homogenization the braze joint during solution heat treatment. Such braze materials may be selected to have melting temperature ranges inclusive of or below the solution heat treating temperature (i.e. the peak hold temperature used during the regiment) for particular superalloy substrate materials of interest. The homogenization and solidification of the braze joint advantageously does not introduce any new elemental constituent into the superalloy substrate material that was not already present in that material.

Alloys disclosed herein include nickel, chromium and titanium, as well as at least one of zirconium and hafnium, which can be stated as Ni—Cr—Ti—(Zr and/or Hf). All compositions described herein are given in weight percent.

The titanium and zirconium and/or hafnium of the disclosed alloys function to reduce the melting point of the alloys. The compositions include sufficient amounts of titanium and zirconium and/or hafnium such that they exhibit a melting temperature range approximately within the range of 1,100-1,200° C. Advantageously, alloys disclosed herein exhibit a melting temperature range that includes or is below the 1,205° C. solution heat treatment temperature of Rene 80 alloy, which makes them particularly well suited for use with that alloy, as well as with alloys such as CM 247 and IN 939 which have solution heat treatment holding temperatures higher than that of Rene 80.

The titanium content of the disclosed alloys functions to increase the strength of the alloys.

The zirconium and/or hafnium content of the disclosed alloys functions to increase the ductility of the alloys.

A Ni—Cr—Ti—Zr braze alloy may be desired when the superalloy component to be repaired or joined contains no or little hafnium. A Ni—Cr—Ti—Hf braze alloy may be desired when the superalloy component to be repaired or joined contains no or little zirconium. A Ni—Cr—Ti—Zr—Hf braze alloy may be desired when the superalloy component to be repaired or joined contains all of these elements.

In an embodiment, a quaternary braze alloy includes:
4.5-15.0% Cr;
7.0-16.5% Ti;
10.0-16.0% Zr;
balance Ni.

One such braze alloy includes:
6.5% Cr;
7.5% Ti;
11.0% Zr;
balance Ni,
which has a liquidus temperature of 1,160° C.

Other alloys in this group may contain:
4.5-5.5% Cr;
7.0-8.0% Ti;
13.0-14.0% Zr;
balance Ni.

A particular alloy in this group includes:
4.9% Cr;
7.3% Ti;

13.0% Zr;
balance Ni,
which has a liquidus temperature of 1,180° C. This braze alloy was successfully tested to form a crack-free braze repair in a 1.2 mm wide surface opening crack in Rene 80 superalloy material. The crack was first filled with −325 mesh alloy CM 247 powder, then the braze alloy powder was applied to cover the surface of the superalloy material and heated to a solution heat treat temperature of 1,220° C. for 4 hours, wherein the braze alloy powder melted and flowed to fill the crack around the alloy CM 247 powder.

In another embodiment, a quaternary braze alloy includes:
4.5-5.5% Cr;
7.0-8.0% Ti;
18.0-19.5% Hf;
balance Ni.
One such braze alloy includes:
4.5% Cr;
8.0% Ti;
18.5% Hf;
balance Ni,
which has a liquidus temperature of 1,160° C.

In a multi-component embodiment, a braze alloy includes:
3.5-5.0% Cr;
7.0-9.0% Ti;
9.5-12.0% Zr;
18.0-19.0% Hf;
balance Ni.
One such braze alloy includes:
4.0% Cr;
8.0% Ti;
10.0% Zr;
18.5% Hf;
balance Ni,
which has a liquidus temperature of 1,085° C.

A repair process utilizing the braze alloys described above is illustrated in FIG. 1 where a gas turbine engine vane 10 formed of a superalloy substrate material 12 has a service-induced discontinuity 14 extending into the substrate material 12 from its surface 16. In this embodiment, the discontinuity 14 is illustrated as a large gap crack having an opening of greater than 0.001 inches at surface 16. After being cleaned using any known process, crack 14 is filled with an alloy-containing powder 18, such as one containing a mixture of superalloy particles 20 and braze material particles 22. The braze particles 22 in the alloy-containing powder 18 may constitute 5-50% by weight of the powder 18. In other embodiments the alloy-containing powder 18 may be only superalloy particles 20. The mesh size range of the braze material particles 22 is preferably smaller (for example −325 mesh/+2 micron) than the superalloy particles 20 (for example −120 mesh/+2 micron) in order to provide enhanced filling of the discontinuity 14. A layer of the braze material particles 22 is disposed above the alloy-containing powder 18 to ensure a complete fill of the discontinuity during the brazing process. During a solution heat treatment of the substrate material 12, the braze material particles 22 melt and fill the discontinuity while the superalloy particles 20 sinter together. The melting point depressant titanium, zirconium and/or hafnium contained in the braze material at a higher concentration than in the base superalloy then distributes into the surrounding superalloy material to achieve a solid homogenous joint. Advantageously, the braze material 22 contains no element that is not contained in the substrate 12 to be brazed so that no new element is introduced into the superalloy material, and the composition of the homogenized joint material is very similar to the substrate material 12, thus providing a structural joint.

Figure 2:
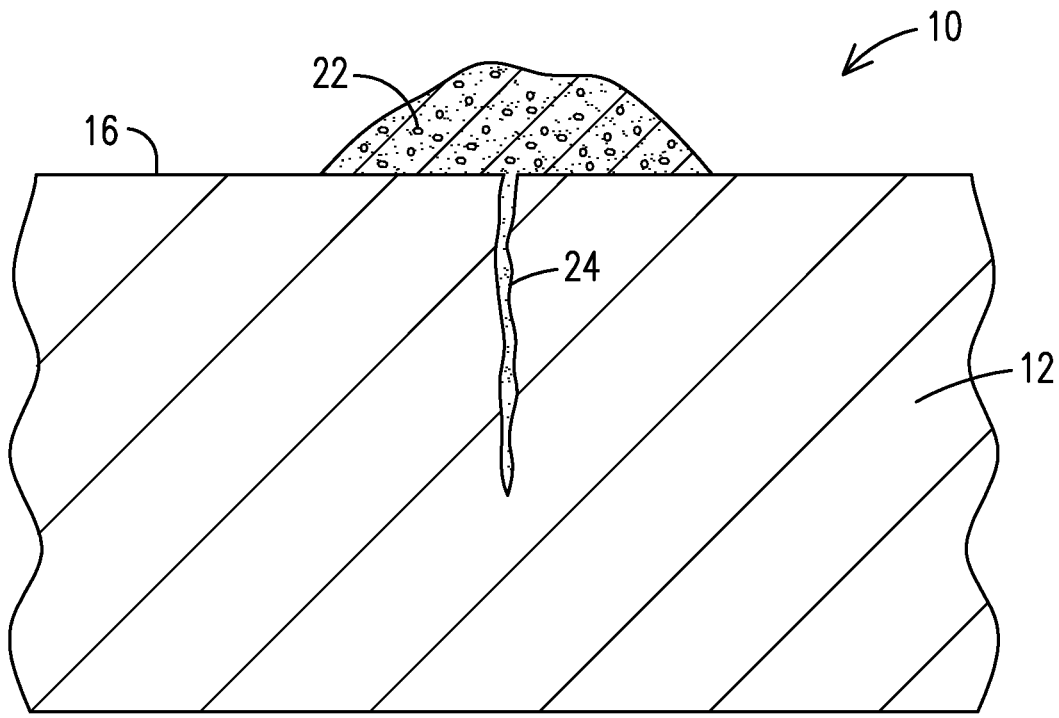
FIG. 2 is a side section view of a gas turbine vane wherein a narrow gap discontinuity being repaired by brazing.

FIG. 2 illustrates a different region of the substrate material 12 wherein a narrow gap discontinuity 24 (less than 0.001 inches) is repaired using only braze material particles 22 of the compositions disclosed herein. Since the width of the discontinuity 24 is limited, there is no need for filling the discontinuity with superalloy particles 20 as in FIG. 1, as the braze material 22 will flow into and fill the discontinuity during the solution heat treatment.

In other embodiments the braze alloys disclosed herein may be formed as a foil or a wire and may be applied with any known process. Repair of a superalloy material surface containing a plurality of discontinuities may be accomplished by optionally filling the discontinuities with superalloy particles (as desired for wider openings), then conducting a heat treatment of the superalloy with a foil of one of the disclosed braze alloys disposed over the surface, causing the braze material to melt, to flow into the discontinuities and to fill around the superalloy particles, then to homogenize and to solidify as the melting temperature element diffuses into the substrate 12.

While various embodiments of the present invention have been shown and described herein, it will be obvious that such embodiments are provided by way of example only. Numerous variations, changes and substitutions may be made without departing from the invention herein.

The invention claimed is:
1. A braze alloy consisting of:
6.5% by weight Cr;
7.5% by weight Ti;
11% by weight Zr; and
75% Ni by weight.
2. A braze alloy consisting of:
4.5% by weight Cr;
8.0% by weight Ti;
18.5% by weight Hf; and
69% by weight Ni.
3. A braze alloy consisting of:
4.0% by weight Cr;
8.0% by weight Ti;
10.0% by weight Zr;
18.5% by weight Hf; and
59.5% by weight Ni.
4. The braze alloy of claim 1, wherein the braze alloy has a liquidus temperature of 1,160° C.

* * * * *